US012602421B1

(12) United States Patent　　(10) Patent No.:　US 12,602,421 B1

Ezrielev et al.　　(45) Date of Patent:　　Apr. 14, 2026

(54) CLASSIFYING RETRIEVED CONTEXT DATA FOR A RELATIVISTIC RESPONSE

(71) Applicant: Dell Products L.P., Round Rock, TX (US)

(72) Inventors: Ofir Ezrielev, Be'er Sheva (IL); Lev Makler, Be'er Sheva (IL); Yehonatan Cohen, Ashdod (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/034,960

(22) Filed: Jan. 23, 2025

(51) Int. Cl.
　　*G06F 16/35*　　(2025.01)
　　*G06F 16/383*　　(2019.01)
(52) U.S. Cl.
　　CPC ............ *G06F 16/35* (2019.01); *G06F 16/383* (2019.01)
(58) Field of Classification Search
　　CPC .... G06F 16/35; G06F 16/383; G06F 16/9532; G06F 16/9537
　　USPC ....................................................... 707/737
　　See application file for complete search history.

(56) References Cited

U.S. PATENT DOCUMENTS

| | | | |
|---|---|---|---|
| 10,664,527 | B1 | 5/2020 | Henderson et al. |
| 11,347,783 | B2 | 5/2022 | Kraus et al. |
| 11,405,457 | B2 | 8/2022 | Ding |
| 12,019,683 | B1 | 6/2024 | Newman |
| 12,106,049 | B1 | 10/2024 | Abi-Akl |
| 12,254,272 | B1 | 3/2025 | Cetoli |
| 12,353,469 | B1 | 7/2025 | Mahabadi |
| 2006/0085423 | A1 | 4/2006 | Barsness |

| | | | |
|---|---|---|---|
| 2016/0203193 | A1 | 7/2016 | Haverlock |
| 2016/0321617 | A1 | 11/2016 | Shastri |
| 2021/0034657 | A1 | 2/2021 | Kale |
| 2021/0081613 | A1 | 3/2021 | Begun |
| 2021/0295822 | A1 | 9/2021 | Tomkins |
| 2021/0406977 | A1 | 12/2021 | Ramachandran |
| 2023/0082381 | A1 | 3/2023 | Gnanasambandam |
| 2024/0086489 | A1 | 3/2024 | Sachindran |

(Continued)

OTHER PUBLICATIONS

Nguyen et al. (Sep. 5, 2024). "An Ontology-based-RAG System using Graph for accurate analytics—a dynamic way to combine information from documents with structured data to drive insights using AGE". Medium. Max.AI Tech Blog. Retrieved from <https://medium.com/max-ai-tech-blog/building-a-graph-based-rag-system-using-apache-age-98e0ac7f9589#:~:text=This%20is%20where%20Ontology%2Dbased,the%20ontology%20and%20data%20grow> on Jan. 28, 2025 (9 pages).

(Continued)

*Primary Examiner* — Shahid A Alam

(74) *Attorney, Agent, or Firm* — WOMBLE BOND DICKINSON (US) LLP

(57)　　　　　ABSTRACT

Methods and systems for managing operation of a system are disclosed. A prompt may be obtained that indicates that relativistic response is to be provided by an inference model. A retrieval process may be performed based on the prompt to obtain context data. The context data may be classified to obtain context data groupings and corresponding meaning descriptions. The context data groupings may be classified based on characteristics of portions of the context data. Ingest data sets may be obtained using the prompt and the context data groupings. The ingest data sets may be provided to the inference model to obtain corresponding responses. The responses may be compared using the meaning descriptions to obtain the relativistic response for use in providing computer-implemented services.

20 Claims, 6 Drawing Sheets

(56)  References Cited

U.S. PATENT DOCUMENTS

| | | | |
|---|---|---|---|
| 2024/0265041 A1 | 8/2024 | Rennie | |
| 2024/0289863 A1 | 8/2024 | Smith Lewis | |
| 2024/0320476 A1 | 9/2024 | Chandrasekaran | |
| 2024/0403341 A1 | 12/2024 | Berglund | |
| 2025/0029171 A1* | 1/2025 | Unnikrishnan | G06F 16/3322 |
| 2025/0094707 A1 | 3/2025 | Portisch | |
| 2025/0181321 A1* | 6/2025 | Gormley | G06F 8/36 |
| 2025/0200090 A1 | 6/2025 | Beringer | |
| 2025/0265276 A1 | 8/2025 | Yadav | |
| 2025/0363142 A1 | 11/2025 | Madisetti | |

OTHER PUBLICATIONS

Toro et al. (Dec. 18, 2023). "Dynamic Retrieval Augmented Generation of Ontologies using Artificial Intelligence (DRAGON-AI)". arXiv:2312.10904. Retrieved from <https://arxiv.org/abs/2312.10904> on Jan. 28, 2025 (31 pages).

Kommineni et al. (Mar. 13, 2024). "From human experts to machines: An LLM supported approach to ontology and knowledge graph construction". arXiv:2403.08345v1. Retrieved from <https://arxiv.org/pdf/2403.08345v1> on Jan. 28, 2025 (10 pages).

Barron et al. (Oct. 3, 2024). "Domain-Specific Retrieval-Augmented Generation Using Vector Stores, Knowledge Graphs, and Tensor Factorization". arXiv:2410.02721. Retrieved from <https://arxiv.org/pdf/2410.02721> on Jan. 28, 2025 (8 pages).

Palantir. (n.d.) "Ontology building/Ontology Manager/Overview". Retrieved from <https://www.palantir.com/docs/foundry/ontology-manager/overview> on Jan. 28, 2025 (10 pages).

Mousavi et al. (Oct. 2, 2024). "DyKnow: Dynamically Verifying Time-Sensitive Factual Knowledge in LLMs". arXiv:2404.08700. Retrieved from <https://arxiv.org/pdf/2404.08700> on Jan. 28, 2025 (16 pages).

Huang et al. (Nov. 30, 2023). "VTimeLLM: Empower LLM to Grasp Video Moments". arXiv:2311.18445. Retrieved from <https://arxiv.org/pdf/2311.18445> on Jan. 28, 2025 (14 pages).

Steve Tueno. (Sep. 23, 2024). "Natural Language Query Engine for Relational Databases using Generative AI". arXiv:2410.07144v1. Retrieved from <https://arxiv.org/pdf/2410.07144> on Jan. 28, 2025 (18 pages).

Jaime Hernández. (Aug. 15, 2024). "Enhancing SQL Query Generation with Large Language Models (LLMs): My Learning Journey". Medium. Retrieved from <https://devjaime.medium.com/enhancing-sql-query-generation-with-large-language-models-llms-my-learning-journey-81f116646314> on Jan. 28, 2025 (4 pages).

Michiardi et al. (May 22, 2018). "Cache-based Multi-query Optimization for Data-intensive Scalable Computing Frameworks". arXiv:1805.08650. Retrieved from <https://arxiv.org/pdf/1805.08650> on Jan. 28, 2025 (14 pages).

Khodak et al. (May 2, 2024). "Learning to Relax: Setting Solver Parameters Across a Sequence of Linear System Instances". arXiv:2310.02246. Retrieved from <https://arxiv.org/pdf/2310.02246> on Jan. 28, 2025 (33 pages).

Niels de Jong (Jul. 13, 2023). "NeoDash 2.3—Create Graph Dashboards With LLM-Powered Natural Language Queries". Medium. Neo4j Developer Blog. Retrieved from <https://medium.com/neo4j/neodash-2-3-create-graph-dashboards-with-llm-powered-natural-language-queries-348cf4dec583> on Jan. 28, 2025 (7 pages).

Li et al. (Feb. 1, 2024). "PAP-REC: Personalized Automatic Prompt for Recommendation Language Model". arXiv:2402.00284v1. Retrieved from <https://arxiv.org/pdf/2402.00284> on Jan. 28, 2025 (24 pages).

Malak et al. (May 14, 2024). "Multi-Server Multi-Function Distributed Computation". arXiv:2405.08732. Retrieved from <https://arxiv.org/pdf/2405.08732> on Jan. 28, 2025 (28 pages).

Informatica. (Apr. 2021). "Creating an Automatic Relational Database Subscription". Retrieved from <https://docs.informatica.com/data-integration/data-integration-hub/10-5/getting-started/creating-subscriptions/creating-an-automatic-relational-database-subscription.html> on Jan. 28, 2025 (2 pages).

* cited by examiner

CLASSIFYING RETRIEVED CONTEXT DATA FOR A RELATIVISTIC RESPONSE

FIELD

Embodiments disclosed herein relate generally to managing a system. More particularly, embodiments disclosed herein relate to systems and methods to manage operation of a system using inference models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
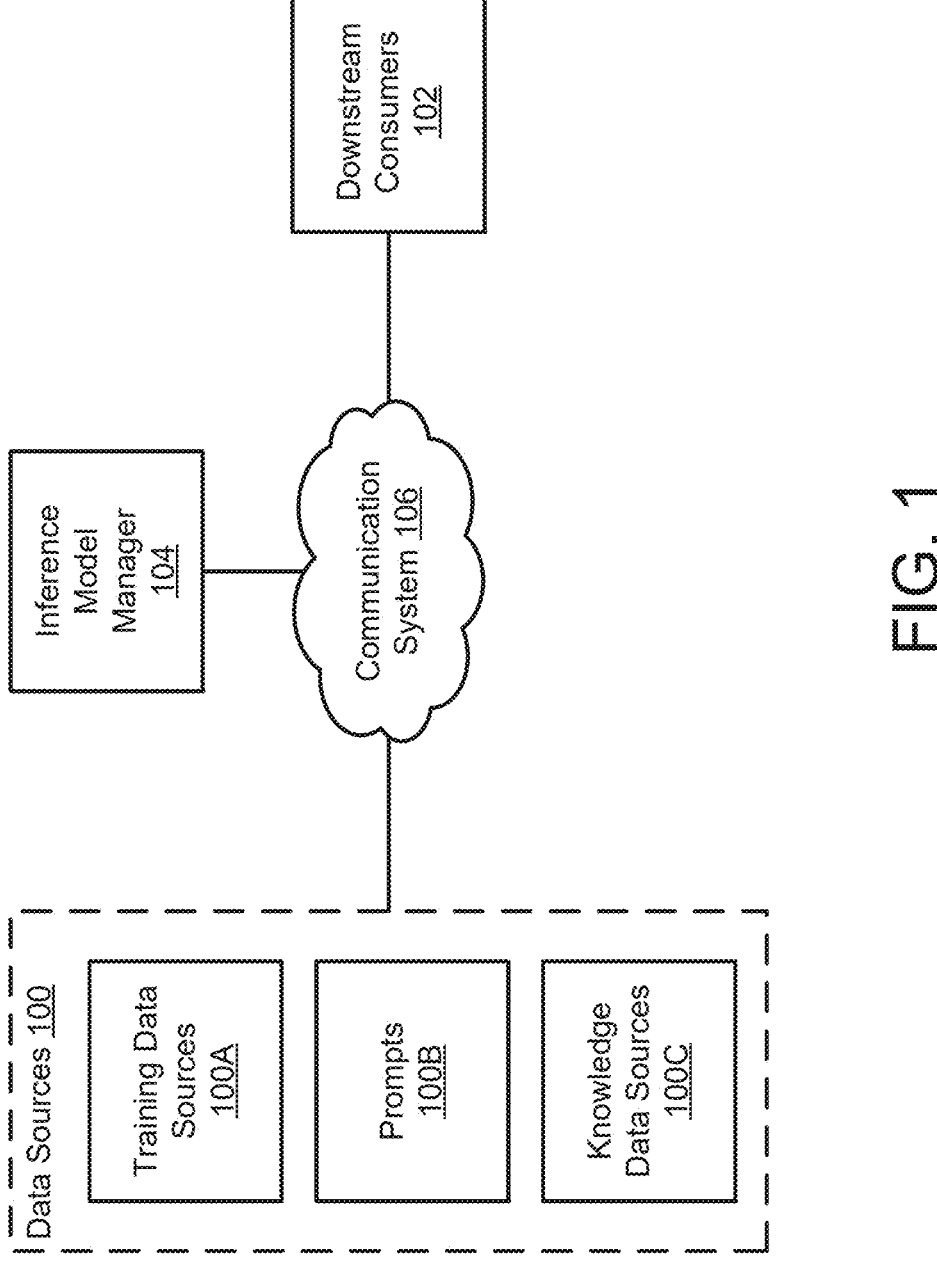
FIG. 1 shows a block diagram illustrating a distributed system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a system that may provide computer-implemented services. The computer-implemented services may be provided using inference models (e.g., a generative trained machine learning model). The inference models may be used to generate inferences regarding operation of the data processing systems, and the inferences may be used in downstream processes to increase a likelihood of desired operation of the data processing systems. For example, the inference models may be trained to infer information regarding occurrences of security events (e.g., security threats) to the data processing systems based on ingest data, and the operation of the data processing systems may be updated to mitigate (e.g., prevent) negative outcomes associated with the security events.

However, a quality (e.g., reliability) of the inferences used to manage the operation of the data processing systems may depend on a quality (e.g., informational content) of the ingest data provided to the (trained) inference models to obtain the inferences. For example, the ingest data may include a prompt (e.g., input from a downstream consumer of the inferences) that indicates that a relativistic response is desired by the downstream consumer. If the informational content of the prompt is limited and/or ambiguous, then the ingest data to the inference model may be inadequate for generating an inference of expected quality.

To improve a quality of a generated response, a retrieval-augmented generation process may be implemented. During the retrieval-augmented generation process, context data (e.g., additional information regarding terms such as words and/or phrases in the prompt) may be retrieved from a trusted knowledge base during a retrieval process. The context data may then be used to increase the informational content of the ingest data provided to the inference models to generate the inference. However, due to limitations of the retrieval process, the context data may be insufficient to generate expected quality ingest data (e.g., ingest data with adequate informational content). For example, relevant information that may be similar and/or dissimilar to a subject of the prompt may not be obtained for use in generating (e.g., via inferencing) a desired relativistic response.

Thus, to increase a likelihood of obtaining a desired relativistic response using the inference model, context data obtained during the retrieval process may be classified to obtain context data groupings. Furthermore, corresponding meaning descriptions may be ascribed to each context data group. Each context data group may be added to a separate ingest data set along with a copy of the prompt for submission to the inference model to obtain a corresponding non-relativistic response. Using the non-relativistic responses and the meaning descriptions, the desired relativistic response may be obtained. By doing so, a quality of the computer-implemented services provided using the relativistic response may be improved.

In an embodiment, a method for managing operation of a system is provided. The method may include: (i) based on a determination that a relativistic response for a prompt submitted for processing by a generative trained machine learning model is to be provided: (a) performing a retrieval process for the prompt to obtain a plurality of portions of context data from at least one designated data source; (b) classifying at least the plurality of portions of context data to obtain context data groupings and corresponding meaning descriptions for the context data groupings; (c) obtaining ingest data sets using the prompt and the context data groupings; (d) obtaining at least one non-relativistic response using the ingest data sets and the generative trained machine learning model; (e) obtaining the relativistic response using the at least one non-relativistic response and the corresponding meaning descriptions; and (f) providing computer implemented services using the relativistic response.

Classifying the at least the plurality of portions of context data may include: (i) identifying a highest ranked portion of the plurality of portions of the context data; (ii) identifying characteristics of the highest ranked portion; and (iii) clustering the plurality of portions of the context data based on the characteristics to obtain the context data groupings.

During the retrieval process the plurality of portions of the context data may be ranked with respect to relevancy to the prompt, and the identifying of the highest ranked portion may be performed using the rankings of the plurality of portions of the context data with respect to relevancy to the prompt.

Identifying the characteristics of the highest ranked portion may include at least one selected from a list of identification processes consisting of: (i) identifying existing tags associated with the highest ranked portion, each of the existing tags ascribing at least one of the characteristics; and analyzing information context of the highest ranked portion to obtain the characteristics.

Each of the context data groupings may include a portion of the plurality of portions of the context data, and each portion of the plurality of portions of the context data may be a member of only one of the context data groupings.

The meaning descriptions may indicate unique meanings for each of the context data groupings, and the meaning descriptions being based on the characteristics and the context data groupings.

Obtaining the ingest data sets may include: (i) adding a copy of the prompt to each of the ingest data sets; and (ii) adding members of different context data groupings to the ingest data sets so that each ingest data set has non-duplicative members of the context data groupings with respect to other ingest data sets.

Obtaining the at least one non-relativistic response may include: separately submitting each of the ingest data sets to the generative trained machine learning model as input data to obtain the at least one non-relativistic response.

Obtaining the relativistic response may include: (i) obtaining at least one comparative statement between at least two of the at least one non-relativistic response using the meaning descriptions; and (ii) generating the relativistic response using the at least one comparative statement and the at least two of the at least one non-relativistic response.

The method may further include: prior to performing the retrieval process: (i) analyzing at least the prompt for indication of desirability of the relativistic response; (ii) in a first instance of the analyzing where the indication is that the relativistic response is desired: (a) making the determination; and (iii) in a second instance of the analyzing where the indication is that the relativistic response is not desired: (a) providing second computer implemented services using a second non-relativistic response generated using the generative trained machine learning model.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a distributed system in accordance with an embodiment is shown. The system shown in FIG. 1 may provide computer-implemented services. The computer-implemented services may include any type and quantity of computer-implemented services. For example, the computer-implemented services may include communication services, data storage services, database services, data generation services, and/or any other type of service that may be implemented with a computing device.

The computer-implemented services may be provided by data processing systems to consumers of the computer-implemented services (e.g., users of the data processing systems, other data processing systems). To provide the computer-implemented services, operation of the data processing system may be managed using artificial intelligence. For example, (trained) inference models may be used to assess, predict, and/or otherwise manage occurrences of events that may negatively impact provisioning of the computer-implemented services as desired, such as security events that may threaten the security of the data processing system (e.g., sensitive data accessible using the data processing systems).

To do so, an inference model such as a generative machine-learning model may be trained to generate a response to (e.g., an inference based on) ingest data. For example, the ingest data may include information regarding programs being executed by components of a data processing system, and the inference model may be trained to identify, based on the ingest data, a security threat to the data processing system and/or actions for managing the security threat. To manage the security threat, the inference may be provided to a downstream process during which operation of the data processing system may be updated in a manner that mitigates an undesired outcome of the security threat.

To increase a likelihood of generating reliable responses during inferencing, a retrieval-augmented generation process may be implemented to improve informational content of the ingest data to the inference models. To do so, the prompt may undergo preprocessing, during which context data may be obtained for terms present in the prompt. For example, to obtain expected quality (e.g., adequate) ingest data, the prompt may be provided to a data pipeline. The data pipeline may include a retrieval process, during which terms in the prompt are identified, and context data for the identified terms is obtained. For example, the retrieval process may use methods to (i) identify terms present in the prompt that may require context data, (ii) identify portions of context data from a trusted data source based on the identified terms, (iii) rank the identified portions of context data, and/or (iv) select a number of the ranked identified portions of context data for use as the context data, and/or perform any other actions.

However, due to limitations of these methods, a diversity and/or quality of the portions of context data used for inferencing may be insufficient for obtaining a relativistic response usable to effectively manage operation of a data processing system. For example, a relativistic response may be desired, based on the prompt, that may provide enhanced information regarding a diverse set of answers to a question indicated by the prompt, relationships between the answers (e.g., comparisons), utility of each answer in various situations, and/or any other information. Consequently, if the ingest data using the context data is inadequate, then a subsequent inferencing process that uses the inadequate ingest data may be less likely to provide reliable inferences, and outcomes of downstream processes (e.g., management processes for the systems) that use the inferences may be undesirable.

In general, embodiments disclosed herein may provide methods, systems, and/or devices for managing operation of a system using inference models in a manner that is more likely to result in desirable management outcomes. To do so, a prompt for processing by the inference models may be determined to desire a relativistic response. A retrieval process may subsequently be performed to obtain context data (e.g., relevant information from a knowledge base). The context data may be classified to obtain context data groupings and corresponding meaning descriptions.

For example, consider a scenario in which the prompt may indicate a desire to receive information regarding resolving a power cycling issue observed in a data processing system. Context data may be obtained during the retrieval process that may include chunks of information relevant to power cycling in various contexts (e.g., different types of devices, hardware and/or software versions, hardware components, configurations, etc.) The context data may be classified by identifying a highest ranked chunk of the chunks of information (e.g., with respect to relevancy to the prompt), identifying characteristics of the highest ranked chunk (e.g., a tag for the device type described in the chunk for which the information is applicable), clustering other chunks of information based on the characteristics to obtain the context data groupings, and/or via any other processes. Furthermore, meaning descriptions may be obtained based on the characteristics and/or the clustering that may ascribe definitions and/or relationships for the context data groupings.

By doing so, the context data groupings may be used to obtain ingest data sets that may be more likely to be adequate for inference models to obtain reliable inferences. For example, any number and/or type of non-relativistic responses may be obtained using the ingest data sets. The non-relativistic responses may be compared to each other using the meaning descriptions to obtain the relativistic response that may describe various answers to the prompt and various aspects in which the various answer may differ, thereby increasing a likelihood that the response may provide desired information usable to manage operation of the system.

To provide the above-mentioned functionality, the distributed system of FIG. 1 may include data sources 100, downstream consumers 102, inference model manager 104, and communication system 106. The distributed system, any components thereof, and/or any other types of devices or components not shown in FIG. 1 may perform all, or a portion of the computer-implemented services independently and/or cooperatively. Each of these components is discussed below.

Data sources 100 may include any type and/or number of data sources. Each of data sources 100 may include hardware and/or software components configured to obtain data, store data, provide data to other entities, and/or to perform any other tasks to facilitate performance of computer-implemented services. Different data sources of data sources 100 may facilitate similar and/or different computer-implemented services. For example, data sources 100 may include training data sources 100A, prompts 100B, knowledge data sources 100C, and/or other sources of data usable to facilitate operation of inference models.

Training data sources 100A may include any number of data sources that provide training data for training of inference models. Training data sources 100A may include sources of raw data, processed data (e.g., curated data), and/or other types of data usable to train (e.g., retrain, fine-tune) the inference models. Refer to the discussion of FIG. 2A for more information regarding training of inference models.

Prompts 100B may include any volume and/or type of data for processing by the inference models. For example, prompts 100B may include any number of prompts obtained from consumers of inferences generated by the inference models (e.g., individuals, computers). Prompts 100B may include unstructured data and may be used, at least in part, to generate ingest data for inference models. For example, prompts 100B may include instances of ontology terms, indication that a relativistic response is desired, and may undergo preprocessing to obtain sufficient context data for generating adequate ingest data. Refer to the discussion of FIGS. 2A-2B for more information regarding prompt preprocessing.

Knowledge data sources 100C may include any number and/or type of data sources that provide context data for prompts 100B. Knowledge data sources 100C may include a data source designated as a source of true data by an operator of inference models. Knowledge data sources 100C may be managed by the operator and/or another entity. For example, knowledge data sources 100C may include information regarding ontology terms included in ontology definitions defined by the operator and/or an organization of the operator, and may be queried during preprocessing of a prompt of prompts 100B (e.g., during a retrieval process). Refer to the discussion of FIG. 2B for more information regarding use of knowledge data sources 100C.

Data sources 100 may include data repositories (e.g., training data repositories and/or knowledge data repositories, not shown), and may provide data to (e.g., allow access to data by) inference model manager 104.

Downstream consumers 102 may include any number and/or type of downstream consumers. For example, downstream consumers 102 may include individuals, organizations, and/or computers. Downstream consumers 102 may consume all, or a portion of the computer-implemented services. For example, downstream consumers 102 may include users of the managed data processing systems.

Downstream consumers 102 may consume all, or a portion of the inferences and/or output from downstream processes that use the inferences. For example, downstream consumers 102 may generate and/or provide prompts of prompts 100B (e.g., portions of ingest data) for processing by the inference models, and may consume inferences generated by the inference models (e.g., in response to the ingest data) and/or output from the downstream processes that use the inferences. The inferences and/or output from the downstream processes may be used by downstream consumers 102 to improve decision-making and/or to automate tasks. For example, downstream consumers 102 may make decisions and/or initiate actions for managing operation of the data processing systems.

Inference model manager 104 may include any number of data processing systems and may manage any number of inference models. Inference model manager 104 may perform tasks relating to management of and/or facilitation of use of the inference models. For example, inference model manager 104 may manage (e.g., facilitate) (i) training processes for the inference models, (ii) preprocessing of prompts for the inference models, (iii) inferencing processes using the inference models (e.g., and the preprocessed prompts), (iv) downstream processes that use inferences obtained using the inference models, and/or (v) distribution of the inferences and/or output derived from the inferences to downstream consumers 102. Refer to the discussion of FIG. 2A for more details regarding operation of inference models.

To increase a likelihood of providing adequate ingest data to the inference models, inference model manager 104 may (i) obtain a prompt for an inference model (e.g., from prompts 100B), (ii) identify that the prompt indicates that a relativistic response is to be provided, (iii) perform a retrieval process for the prompt to obtain context data, (iv) classify portions of the context data to obtain context data groupings and corresponding meaning descriptions, (v) obtain any number of ingest data sets using the context data groupings and the prompt, and/or perform any other actions. Refer to the discussion of FIG. 2B for more details regarding classification of the retrieved context data.

To facilitate management of operation of the data processing systems using inference models, inference model manager 104 may (i) use the ingest data to obtain at least one inference (e.g., a non-relativistic response) from an inference model, (ii) obtain the relativistic response using the at least one inference and corresponding meaning descriptions, and/or (iii) use the relativistic response to provision desired computer-implemented services (e.g., distribute the response to downstream consumers 102 and/or by provide the response to downstream processes).

When providing their functionality, any of data sources 100, downstream consumers 102, inference model manager 104, and/or components thereof may perform all, or a portion of the actions and methods illustrated in FIGS. 2A-3B.

Any of data sources 100, downstream consumers 102, and inference model manager 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

Any of the components illustrated in FIG. 1 may be operably connected to each other (and/or components not illustrated) with communication system 106. Communication system 106 may facilitate communications between the components of FIG. 1. In an embodiment, communication system 106 includes one or more networks that facilitate communication between any number of components. The networks may include wired networks and/or wireless networks (e.g., and/or the Internet). The networks and communication devices may operate in accordance with any number and types of communication protocols (e.g., such as the Internet protocol).

While illustrated in FIG. 1 as including a limited number of specific components, a system in accordance with an embodiment may include fewer, additional, and/or different components than those illustrated therein.

Figure 2A:
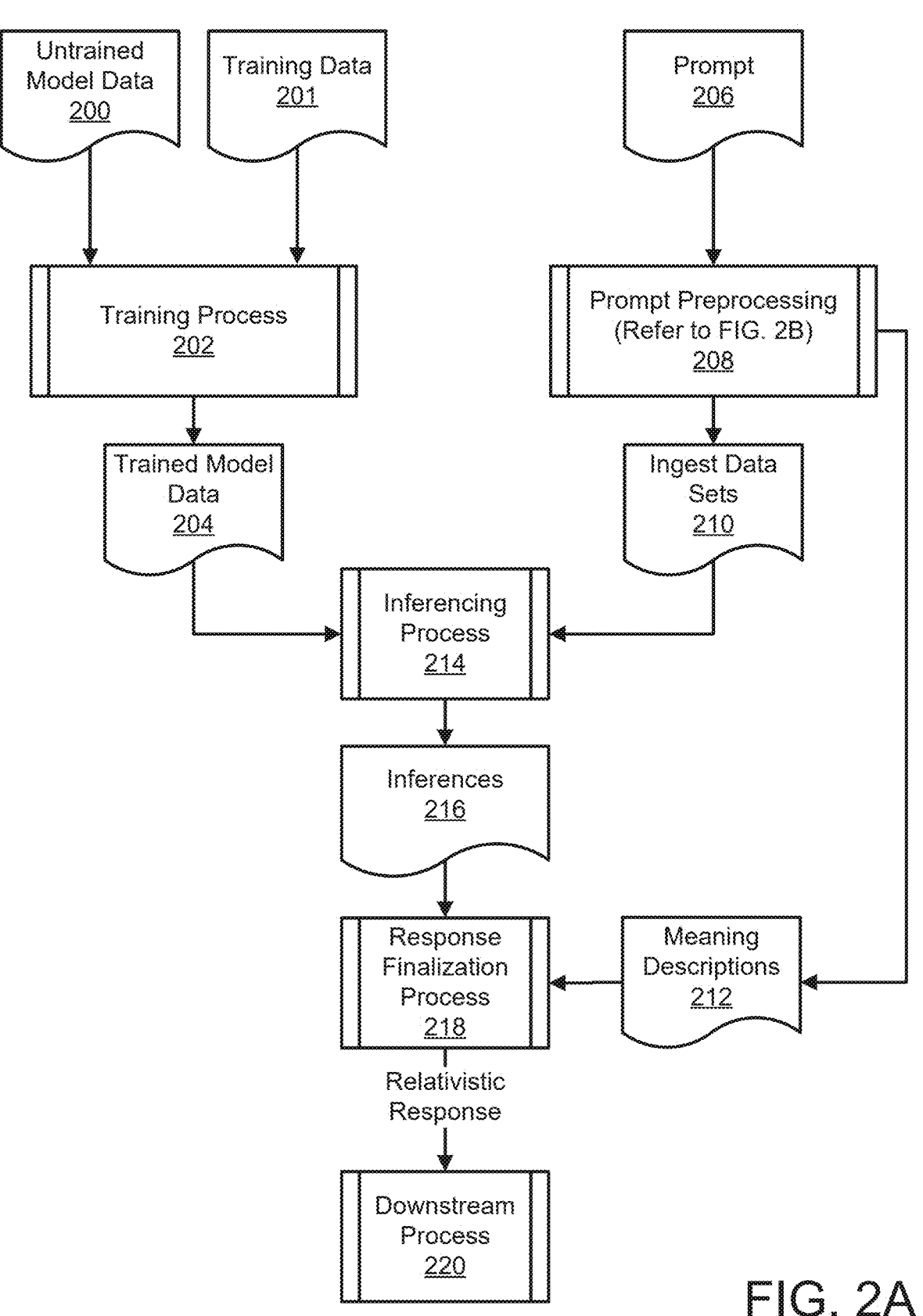
FIGS. 2A-2B show data flow diagrams in accordance with an embodiment.
Figure 2B:
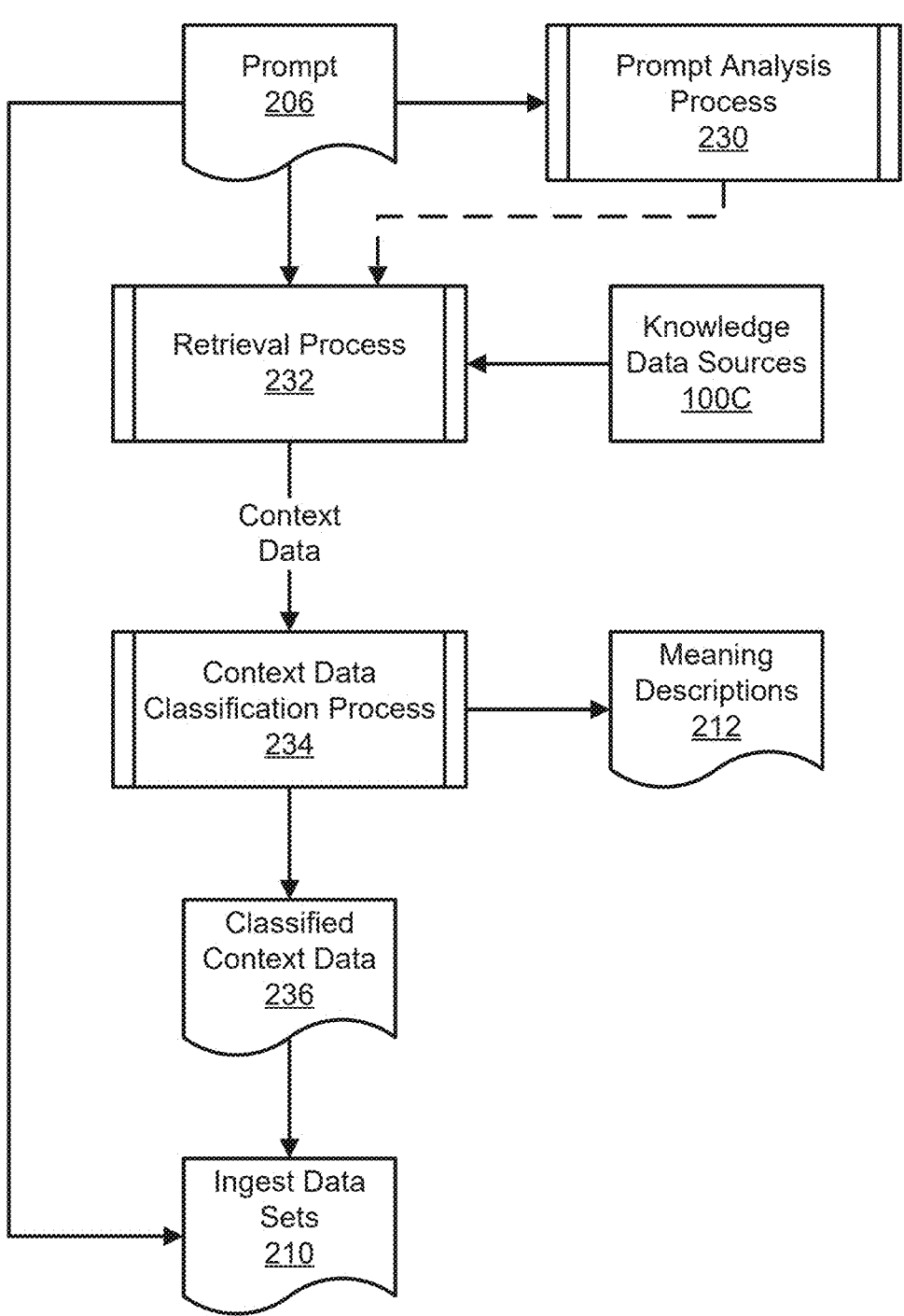

To further clarify embodiments disclosed herein, data flow diagrams in accordance with an embodiment are shown in FIGS. 2A-2B. In the diagram, flows of data and processing of data are illustrated using different sets of shapes. A first set of shapes (e.g., 200, 201) is used to represent data structures, a second set of shapes (e.g., 202, 208) is used to represent processes performed using and/or that generate data, and a third set of shapes (e.g., 100C) is used to represent sources of data.

Turning to FIG. 2A, a first data flow diagram in accordance with an embodiment is shown. The first data flow diagram may illustrate data used in and data processing performed when facilitating operation of an inference model. For example, the inference model may be used to obtain responses usable to manage operation of a data processing system.

In the example shown in FIG. 2A, operation of the inference model may include a training process and an inferencing process. The training process may include, for example, initial training of an (untrained) inference model, retraining of an inference model, and/or fine-tuning of an inference model. The inferencing process may include, for example, obtaining inferences using a trained inference model.

To obtain a trained inference model, a management entity (e.g., inference model manager 104) may facilitate performance of training process 202. Training process 202 may include training an untrained inference model defined by untrained model data 200.

Untrained model data 200 may include information relating to model architecture, hyperparameters, and/or other information regarding an untrained inference model (e.g., optimization algorithm information, hidden layer information, bias function descriptions, activation function descriptions, etc.). An inference model type and/or size may be selected based on performance goals and/or constraints, training data availability and/or quality, budget, timeline, etc. For example, the inference model may include a probabilistic model such as a generative machine-learning model (e.g., a large language model).

During training process 202, untrained model data 200 may be updated using training data 201. Training data 201 may be obtained from any number of data sources (e.g., training data sources 100A). For example, if the inference model is being trained to manage security for a data processing system, then the training data may include a corpus of information regarding types of security threats to the data processing system, labeled with actions for responding to the types of security threats (e.g., actions for reconfiguring security settings of the data processing system accordingly). As the inference model is exposed to large numbers of relationships and/or patterns in training data 201, weights and/or other parameters of untrained model data 200 may be modified to obtain trained model data 204.

Trained model data 204 may include inference model data (e.g., information regarding the architecture and/or hyperparameters of the inference model) and/or model parameter values of the inference model (e.g., weights). Trained model data 204 may be used during an inferencing process to generate inferences in response to ingest data, such as ingest data sets 210.

Ingest data sets 210 may include a portion of data for which an inference is desired to be obtained. For example, ingest data sets 210 may include prompt 206 (e.g., of prompts 100B). Prompt 206 may be obtained, for example, from a consumer of inferences and may indicate that a relativistic response is desired. To obtain ingest data sets 210 (e.g., an enhanced version of prompt 206), prompt 206 may undergo prompt preprocessing 208. For example, during prompt preprocessing 208, context data relevant to prompt 206 may be obtained, the context data may be classified to obtain context data groupings and corresponding meaning descriptions (e.g., 212), and ingest data sets 210 may be generated based on prompt 206 and/or the context data groupings. Members of different context data groupings may be added such that each ingest data set of ingest data sets 210 may have a unique portion of context data (e.g., non-duplicative members of a context data grouping with respect to other ingest data sets). Refer to the discussion of FIG. 2B for more details regarding prompt preprocessing and/or obtaining ingest data sets 210 and meaning descriptions 212.

Ingest data sets 210, along with trained model data 204, may be provided to inferencing process 214. During inferencing process 214, a trained inference model may be obtained based on information (e.g., node information, weight information, connection information, activation functions, attention mechanisms, etc.) included in trained model data 204. Ingest data sets 210 may not include labeled data and, thus, an association for ingest data sets 210 may not be known. During inferencing process 214, the trained inference model (e.g., a trained generative machine-learning model) may read ingest data sets 210 and respond with an output likely to be associated with the input (e.g., the trained inference model may generate an inference). To do so, each ingest data set of ingest data sets 210 may be separately submitted to the trained inference model.

For example, ingest data sets 210 may include information regarding malicious code being executed by a data processing system that may be separated into different groupings (e.g., based on a type of software resource executing the code, a type of hardware resource involved, etc.). Each grouping may be added to a different ingest data set of ingest data sets 210 and submitted to the trained inference model to obtain a corresponding inference (e.g., a non-relativistic inference). Each inference of inferences 216 may include set of actions for updating security settings of the data processing system that are likely to mitigate an outcome of the execution of the malicious code with respect to a corresponding ingest data set.

To obtain the relativistic response based on inferences 216, response finalization process 218 may be performed. During response finalization process 218, comparative statements may be obtained to describe relationships between inferences 216, and the relativistic response may be generated. For example, the comparative statements may be obtained, using meaning descriptions 212, by aggregating non-relativistic responses of inferences 216, mapping the non-relativistic responses to identified characteristics of at least a portion of the context data (e.g., a highest ranked portion of context data), identifying relationships between the non-relativistic responses, and/or via any other processes. Meaning descriptions 212 may be obtained during prompt preprocessing 208 and may include, for example, information (e.g., tags, labels, attributes, etc.) attributed to portions of context data. The information may indicate unique meanings for each of the context data groupings based on characteristics of the context data groupings.

By doing so, the relativistic response may be generated using at least a portion of the comparative statements and the non-relativistic responses of inferences 216. For example, the relativistic response may suggest a first action set to perform if the system utilizes a first version of hardware resources, and a second action set to perform if the system utilizes a second version of the hardware resources. The relativistic response obtained during response finalization process 218 may be used to provision computer-implemented services.

To provision the computer-implemented services, downstream process 220 may be performed. During downstream process 220, the relativistic response may be provided to a downstream consumer, and operation of the data processing system may be updated using the relativistic response. The relativistic response may be to the downstream consumer, for example, by presenting the response via a user interface viewable by the downstream consumer. Operation of the data processing system may be updated directly based on the relativistic response (e.g., using a decision-making policy), and/or initiated by the downstream consumer as a result of consuming the relativistic response. For example, downstream process 220 may include a policy enforcement process, wherein security policies for the data processing system are enforced based on information indicated by the relativistic response (e.g., actions, security and/or configuration settings) in order to mitigate outcomes associated with the execution of the malicious code. For example, operation of the data processing system may be updated to prevent access to sensitive data, to prevent network communication via components of the data processing system, and/or to disable operation of portions of components of the data processing system.

Although described with respect to security of the data processing system, it will be appreciated that the inference models may be trained and used to update operation of the data processing system in various capacities without departing from the embodiments disclosed herein. For example, the operation of the data processing system may be updated to improve user experience, to manage failures of components of the data processing system, to improve efficient allocation of resources (e.g., computing and/or power resources), and/or to meet other operational goals for the data processing system.

Thus, using the data flows shown in FIG. 2A, operation of a system may be managed using a relativistic response obtained using a trained inference model. By doing so, operation of the system may be more likely to be updated in a manner that may provide desired computer-implemented services.

Turning to FIG. 2B, a second data flow diagram in accordance with an embodiment is shown. The second data flow diagram may illustrate data used in and data processing performed during obtaining of ingest data sets for an inference model and corresponding meaning descriptions. FIG. 2B may be an example of prompt preprocessing 208 of FIG. 2A.

To obtain the ingest data, context data for prompt 206 may be retrieved from knowledge data sources 100C. Prompt 206 may include a submission to be processed by a trained inference model to facilitate provisioning of desired computer-implemented services by a data processing system. For example, prompt 206 may include information regarding operation of the data processing system, a request for second information (e.g., a question), and/or any other information. Furthermore, prompt 206 may indicate a desire for a non-relativistic response (e.g., one specific answer to a question) or a relativistic response (e.g., a response that compares various answers to the question based on different situations, contexts, interpretations, approaches, etc.).

To determine whether prompt 206 indicates that a relativistic response is desired, prompt analysis process 230 may be performed. During prompt analysis process 230, prompt 206 may be analyzed for indication of desirability of the relativistic response. For example, an explicit indication may be identified (e.g., an option to receive a relativistic response may be selected), a key-phrase may be identified, intent of the prompt may be inferred (e.g., using natural language processing), and/or any other actions may be performed (e.g., by inference model manager 104). If determined that prompt 206 indicates that the relativistic response is desired, retrieval process 232 may be performed to obtain relevant context data (e.g., data flow shown in long-dashed lines). However, if determined that the relativistic response is not desired, a different process (e.g., that may be similar and/or different to retrieval process 232, not shown) may be performed to provide different computer-implemented services based on the prompt.

To obtain the context data for prompt 206, retrieval process 232 may be performed. Retrieval process 232 may include any type of process(es) wherein information (e.g., terms) present in a prompt is identified, and additional information is retrieved from a data source based on the identified information. For example, retrieval process 232 may implement information retrieval methods used during type of retrieval-augmented generation process. During retrieval process 232, a prompt (e.g., prompt 206) may be obtained and used to generate a query (e.g., a keyword search query). The query may include, for example, search terms, search parameters, and/or other information. The query may then be used to search an external data source such as knowledge data sources 100C to identify responsive portions of data stored by the external data source.

As discussed with respect to FIG. 1, knowledge data sources 100C may include a data source designated as a source of true (e.g., trusted, reliable, relevant to a subject area) data by an operator of the inference model. For example, knowledge data sources 100C may include a number of chunks of data that are tagged to associate each of the number of chunks of data with ontology terms (and/or other searchable terms).

Once obtained, the context data may be classified to obtain context data groupings relevant to prompt 206. To do so, context data classification process 234 may be performed. During context data classification process 234, portions of the context data may be ranked, and the portions may be clustered to obtain the context data groupings and corresponding meaning descriptions. For example, the portions of the context data may be ranked during retrieval process 232 using a relevance ranking algorithm. A highest ranked portion (e.g., a top hit chunk) of the context data may be selected, and characteristics of the highest ranked portion of context data may be identified. For example, tags and/or other information content of the highest ranked portion of context data may be obtained. By doing so, other portions of the context data may be clustered based on the characteristics to obtain classified context data 236 (e.g., the context data groupings). For example, the portions of context data may be grouped according to the tags to obtain any number of groups of context data that may be similar and/or dissimilar to each other.

Once obtained, classified context data 236 may be used to obtain input data for the trained inference model (as discussed in FIG. 2A). To do so, a copy of prompt 206 may be added to each ingest data set of ingest data sets 210 along with a context data grouping of classified context data 236 (as shown in the data flow).

Furthermore, the characteristics of the context data groupings may be evaluated to obtain meaning descriptions 212. As previously discussed, meaning descriptions 212 may include, for example, information (e.g., tags, labels, attributes, etc.) attributed to portions of context data. The information may indicate unique meanings for each of the context data groupings based on characteristics of the context data groupings. For example, the context data may be evaluated using an ontology that may define words and/or phrases that have been designated as having a higher degree of meaning by an operator of the inference model than other words and/or phrases not designated as having the higher degree of meaning by the operator. For example, the ontology terms may include words and/or phrases that have different definitions in different subject areas.

Thus, using the data flows shown in FIG. 2B, relevant context information may be obtained and classified based on a prompt. By doing so, a diverse set of context data and corresponding meaning descriptions may be used to generate any number of inferences for use in obtaining a desired relativistic response to the prompt.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
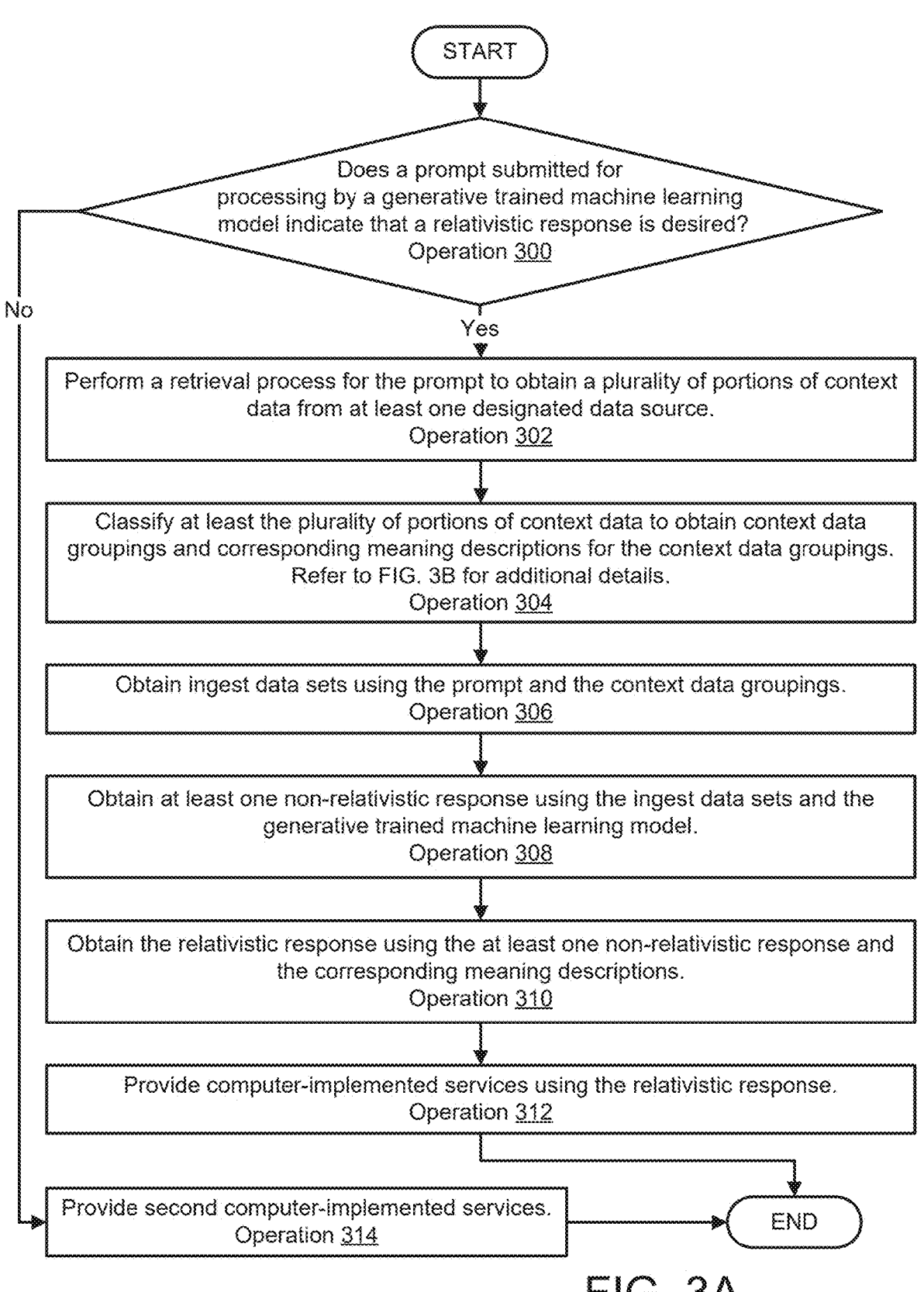
FIGS. 3A-3B show flow diagrams illustrating a method in accordance with an embodiment.

Turning to FIG. 3A, a first flow diagram illustrating a method in accordance with an embodiment is shown. The flow diagram may illustrate various operations performed while managing operation of a system.

At operation 300, a determination may be made regarding whether a relativistic response for a prompt submitted for processing by a generative trained machine learning model is to be provided. The determination may be made by (i) analyzing at least the prompt for indication of desirability of the relativistic response, (ii) evaluating, using a natural language processing tool, an intent of the prompt, (iii) assessing a level of specificity based on the prompt, and/or via any other processes. If the prompt is determined to indicate that the relativistic response is desired (e.g., the determination is "Yes" at operation 300), the method may proceed to operation 302 following operation 300. If the prompt is determined to indication that the relativistic response is not desired (e.g., the determination is "No" at operation 300), the method may proceed to operation 314 following operation 300.

At operation 302, a retrieval process may be performed for the prompt to obtain a plurality of portions of context data. The retrieval process may be performed by: (i) deriving a query based on the prompt, (ii) encoding the query using a pretrained embedding model, (iii) searching a knowledge based using a retrieval system (e.g., dense retrieval, sparse retrieval, etc.), performing a ranking process using a ranking algorithm to rank the portions of context data, and/or performing any other actions.

Figure 3B:
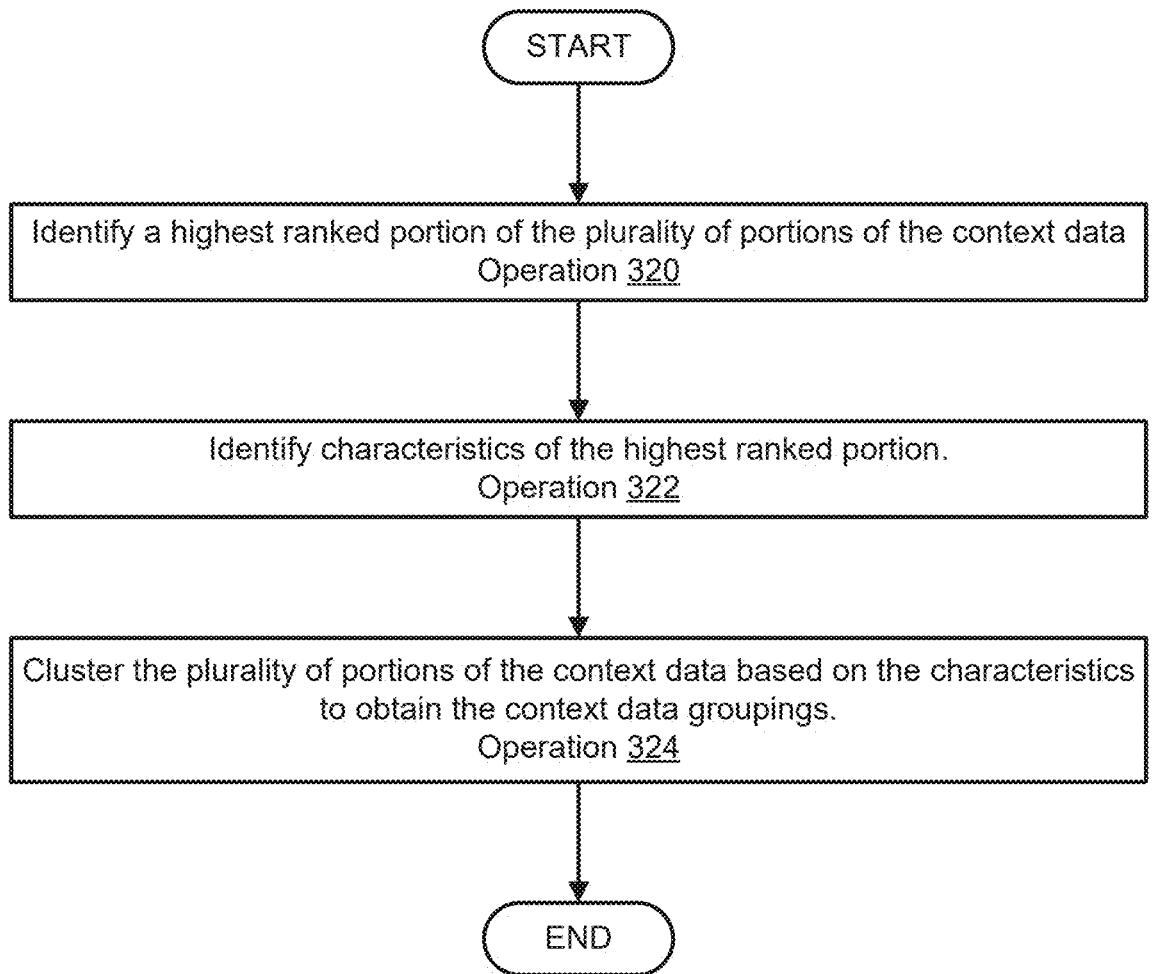

At operation 304, at least the plurality of portions of context data may be classified. The plurality of portions of context data may be classified may be classified by: (i) identifying a highest ranked portion of the context data, (ii)

identifying characteristics of the highest ranked portion, clustering the portions of context data based on the characteristics to obtain context data groupings, and/or performing any other actions. Refer to FIG. 3B for additional details regarding classifying the portions of context data.

At operation 306, ingest data sets may be obtained using the prompt and the context data groupings. The ingest data sets may be obtained by: (i) creating a plurality of enhanced prompts to be provided to an inference model, (ii) adding a copy of the original prompt along with a unique context data group to each enhanced prompt to establish a focused context for the prompt, and/or via any other processes.

At operation 308, at least one non-relativistic response may be obtained using the ingest data sets and the generative trained machine learning model. The at least one non-relativistic response may be obtained by: (i) separately submitting each of the ingest data sets to the generative trained machine learning model, (ii) collecting corresponding results of inferencing performed by the generative trained machine learning model, and/or performing any other actions.

At operation 310, the relativistic response may be obtained using the at least one non-relativistic response and the corresponding meaning descriptions. The relativistic response may be obtained by: (i) guiding the generative trained machine learning model to compare the non-relativistic responses to each other, (ii) aggregating the non-relativistic responses to obtain a range of answers, (iii) obtaining comparative statements to reflect relationships between the non-relativistic responses, and/or performing any other actions.

At operation 312, computer-implemented services may be provided using the relativistic response. The computer-implemented services may be provided by: (i) providing the relativistic response to a downstream consumer as a first portion of the desired computer-implemented services, (ii) providing the relativistic response to a downstream process to obtain an output from the downstream process, and/or (iii) using the output from the downstream process to provision a second portion of the desired computer-implemented services.

The method may end following operation 312.

Returning to operation 300, if the prompt was determined to indicate that the relativistic response is not desired (e.g., the determination is "No" at operation 300), the method may proceed to operation 314 following operation 300.

At operation 314, second computer-implemented services may be provided using a second non-relativistic response generated using the generative trained machine learning model. The second computer-implemented services may be provided by: (i) performing a second retrieval process (e.g., a retrieval augmented generation process that may be similar or different from the first retrieval process) to obtain second context data, (ii) prompting the generative trained machine learning model using the prompt and the second context data to obtain at least one inference, (iii) updating operation of the system based on the at least one inference, and/or performing any other actions.

The method may end following operation 314.

Turning to FIG. 3B, a second flow diagram illustrating a method in accordance with an embodiment is shown. The flow diagram may illustrate various operations performed while classifying the portions of context data obtained during the retrieval process.

At operation 320, a highest ranked portion of the plurality of portions of the context data may be identified. The highest ranked portion may be identified by: (i) selecting the top hit chunk returned during the retrieval process, (ii) performing a reranking process based on an ontology to obtain new rankings for the context data and selecting the new top hit, (iii) selecting a random portion that may be within an acceptable range of relevancy scores, and/or performing any other actions.

At operation 322, characteristics of the highest ranked portion of context data may be identified. The characteristics may be identified by: (i) identifying tags associated with the portion of context data, (ii) extracting information from the content of the portion of context data (e.g., using natural language processing), (iii) prompting an inference model, and/or via any other processes.

At operation 324, the plurality of portions of the context data may be clustered based on the characteristics to obtain the context data groupings. The portions of context data may be clustered by: (i) scoring the portions of context data with respect to similarity to characteristics of the highest ranked portion, (ii) identifying a dimensionality of the characteristics, (iii) applying a clustering algorithm (e.g., partition-based clustering, density-based clustering, etc.) on the context data, (iv) refining the clustering results based on the prompt and/or a subject of the prompt, and/or performing any other actions.

The method may end following operation 324.

Thus, as illustrated above, embodiments disclosed herein may provide systems and methods for managing context data retrieval for inference models used to manage operation of a data processing system. By classifying the context data to obtain context data groupings and corresponding meaning descriptions, a more diverse set of ingest data may be used to obtain inferences using an inference model. As a result, a relativistic response may be obtained using the inferences and the meaning descriptions that may be more likely to effectively manage operation of a system to provide desired computer-implemented services (e.g., provide quality information to manage various situations).

Figure 4:
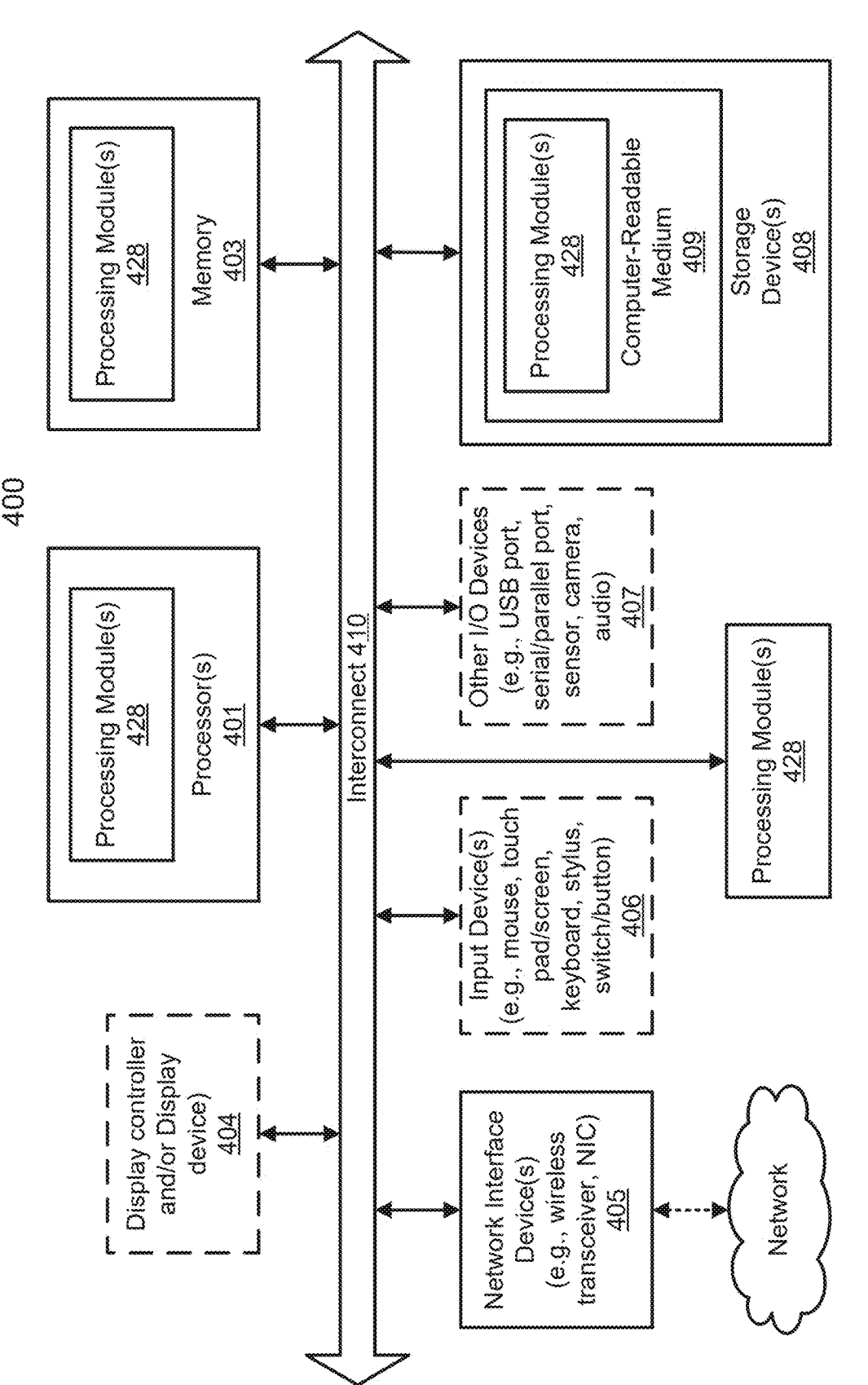
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a system, the method comprising:
based on a determination that a relativistic response for a prompt submitted for processing by a generative trained machine learning model is to be provided:
performing a retrieval process for the prompt to obtain a plurality of portions of context data from at least one designated data source;
classifying at least the plurality of portions of context data to obtain context data groupings and corresponding meaning descriptions for the context data groupings;
obtaining ingest data sets using the prompt and the context data groupings;
obtaining at least one non-relativistic response using the ingest data sets and the generative trained machine learning model;
obtaining the relativistic response using the at least one non-relativistic response and the corresponding meaning descriptions; and
providing computer-implemented services using the relativistic response,
wherein prior to performing the retrieval process, the method further comprises:
analyzing at least the prompt for indication of desirability of the relativistic response; and
in a first instance of the analyzing where the indication is that the relativistic response is desired: making the determination.

2. The method of claim 1, wherein classifying the at least the plurality of portions of context data comprises:
identifying a highest ranked portion of the plurality of portions of the context data;
identifying characteristics of the highest ranked portion; and
clustering the plurality of portions of the context data based on the characteristics to obtain the context data groupings.

3. The method of claim 2, wherein during the retrieval process the plurality of portions of the context data are ranked with respect to relevancy to the prompt, and the identifying of the highest ranked portion is performed using the rankings of the plurality of portions of the context data with respect to relevancy to the prompt.

4. The method of claim 2, wherein identifying the characteristics of the highest ranked portion comprises at least one selected from a list of identification processes consisting of:

identifying existing tags associated with the highest ranked portion, each of the existing tags ascribing at least one of the characteristics; and analyzing information context of the highest ranked portion to obtain the characteristics.

5. The method of claim 2, wherein each of the context data groupings comprises a portion of the plurality of portions of the context data, and each portion of the plurality of portions of the context data is a member of only one of the context data groupings.

6. The method of claim 2, wherein the corresponding meaning descriptions indicate unique meanings for each of the context data groupings, and the corresponding meaning descriptions being based on the characteristics and the context data groupings.

7. The method of claim 1, wherein obtaining the ingest data sets comprises:

adding a copy of the prompt to each of the ingest data sets; and adding members of different context data groupings to the ingest data sets so that each ingest data set has non-duplicative members of the context data groupings with respect to other ingest data sets.

8. The method of claim 1, obtaining the at least one non-relativistic response comprises:

separately submitting each of the ingest data sets to the generative trained machine learning model as input data to obtain the at least one non-relativistic response.

9. The method of claim 1, wherein obtaining the relativistic response comprises:

obtaining at least one comparative statement between at least two of the at least one non-relativistic response using the corresponding meaning descriptions; and generating the relativistic response using the at least one comparative statement and the at least two of the at least one non-relativistic response.

10. The method of claim 1, further comprising and prior to performing the retrieval process:

in a second instance of the analyzing where the indication is that the relativistic response is not desired: providing second computer implemented services using a second non-relativistic response generated using the generative trained machine learning model.

11. A non-transitory machine-readable medium having instructions stored therein, which when executed by a processor, cause the processor to perform operations for managing operation of a system, the operations comprising:

based on a determination that a relativistic response for a prompt submitted for processing by a generative trained machine learning model is to be provided:

performing a retrieval process for the prompt to obtain a plurality of portions of context data from at least one designated data source;

classifying at least the plurality of portions of context data to obtain context data groupings and corresponding meaning descriptions for the context data groupings;

obtaining ingest data sets using the prompt and the context data groupings;

obtaining at least one non-relativistic response using the ingest data sets and the generative trained machine learning model;

obtaining the relativistic response using the at least one non-relativistic response and the corresponding meaning descriptions; and providing computer-implemented services using the relativistic response, wherein prior to performing the retrieval process, the operations further comprise:

analyzing at least the prompt for indication of desirability of the relativistic response; and in a first instance of the analyzing where the indication is that the relativistic response is desired: making the determination.

12. The non-transitory machine-readable medium of claim 11, wherein classifying the at least the plurality of portions of context data comprises:

identifying a highest ranked portion of the plurality of portions of the context data;

identifying characteristics of the highest ranked portion; and clustering the plurality of portions of the context data based on the characteristics to obtain the context data groupings.

13. The non-transitory machine-readable medium of claim 12, wherein during the retrieval process the plurality of portions of the context data are ranked with respect to relevancy to the prompt, and the identifying of the highest ranked portion is performed using the rankings of the plurality of portions of the context data with respect to relevancy to the prompt.

14. The non-transitory machine-readable medium of claim 12, wherein identifying the characteristics of the highest ranked portion comprises at least one selected from a list of identification processes consisting of:

identifying existing tags associated with the highest ranked portion, each of the existing tags ascribing at least one of the characteristics; and analyzing information context of the highest ranked portion to obtain the characteristics.

15. The non-transitory machine-readable medium of claim 12, wherein each of the context data groupings comprises a portion of the plurality of portions of the context data, and each portion of the plurality of portions of the context data is a member of only one of the context data groupings.

16. A data processing system, comprising:

a processor; and a memory coupled to the processor to store instructions, which when executed by the processor, cause operations for managing operation of a system to be performed, the operations comprising:

based on a determination that a relativistic response for a prompt submitted for processing by a generative trained machine learning model is to be provided:

performing a retrieval process for the prompt to obtain a plurality of portions of context data from at least one designated data source;

classifying at least the plurality of portions of context data to obtain context data groupings and corresponding meaning descriptions for the context data groupings;

obtaining ingest data sets using the prompt and the context data groupings;

obtaining at least one non-relativistic response using the ingest data sets and the generative trained machine learning model;

obtaining the relativistic response using the at least one non-relativistic response and the corresponding meaning descriptions; and providing computer-implemented services using the relativistic response, wherein prior to performing the retrieval process, the operations further comprise:

analyzing at least the prompt for indication of desirability of the relativistic response; and in a first instance of the analyzing where the indication is that the relativistic response is desired: making the determination.

17. The data processing system of claim 16, wherein classifying the at least the plurality of portions of context data comprises:

identifying a highest ranked portion of the plurality of portions of the context data;

identifying characteristics of the highest ranked portion; and clustering the plurality of portions of the context data based on the characteristics to obtain the context data groupings.

18. The data processing system of claim 17, wherein during the retrieval process the plurality of portions of the context data are ranked with respect to relevancy to the prompt, and the identifying of the highest ranked portion is performed using the rankings of the plurality of portions of the context data with respect to relevancy to the prompt.

19. The data processing system of claim 17, wherein identifying the characteristics of the highest ranked portion comprises at least one selected from a list of identification processes consisting of:

identifying existing tags associated with the highest ranked portion, each of the existing tags ascribing at least one of the characteristics; and analyzing information context of the highest ranked portion to obtain the characteristics.

20. The data processing system of claim 17, wherein each of the context data groupings comprises a portion of the plurality of portions of the context data, and each portion of the plurality of portions of the context data is a member of only one of the context data groupings.

\* \* \* \* \*